United States Patent [19]

Katahira

[11] Patent Number: 5,231,888
[45] Date of Patent: Aug. 3, 1993

[54] BALL SCREW DEVICE WITH INTERNAL MOTORS

[75] Inventor: Masayuki Katahira, Maebashi, Japan

[73] Assignee: NSK Ltd., Tokyo, Japan

[21] Appl. No.: 887,632

[22] Filed: May 22, 1992

[30] Foreign Application Priority Data

May 27, 1991 [JP] Japan .................. 3-121035

[51] Int. Cl.⁵ ............................................. F16H 1/18
[52] U.S. Cl. .............................. 74/424.8 R; 74/89.15; 74/459; 192/141
[58] Field of Search ........ 74/89.15, 424.8 R, 424.8 B, 74/459; 192/141

[56] References Cited

U.S. PATENT DOCUMENTS

| | | | |
|---|---|---|---|
| 2,860,266 | 11/1958 | Schrader | 74/424.8 B |
| 3,667,195 | 6/1972 | Angilly, Jr. et al. | 74/424.8 R X |
| 4,586,394 | 5/1986 | Perkins | 74/89.15 X |
| 4,840,077 | 6/1989 | Katahira | 74/424.8 R X |
| 4,916,963 | 4/1990 | Takei | 74/424.8 B |
| 4,939,946 | 7/1990 | Teramachi et al. | 74/89.15 |
| 5,041,748 | 8/1991 | Huber | 74/89.15 X |

FOREIGN PATENT DOCUMENTS 62-165057 7/1987 Japan .

Primary Examiner—Allan D. Herrmann
Assistant Examiner—David W. Laub
Attorney, Agent, or Firm—Pennie & Edmonds

[57] ABSTRACT

A ball screw device with internal motors comprises a shaft provided with a ball screw groove and a ball spline groove, a ball screw nut threaded on the shaft with balls interposed therebetween, a ball spline nut threaded on the shaft with balls interposed therebetween, and direct drive motors having rotors and stators, respectively. The rotors are provided on outer circumferences of the ball screw nut and ball spline nut, respectively, so that the rotors can rotate integrally with the corresponding nuts. The stators are arranged in an opposing circumference-to-circumference relationship with outer circumferences of the rotors and are secured on an inner wall of a housing. To detect rotation angles of the nuts, rotational positions sensors are arranged close to each other between the nuts. To prevent dust from spreading into a surrounding environment such as a clean room, an air suction path can be provided in the housing to communicate gaps between the nuts and the shaft and gaps between the nuts and the corresponding drive motors to an exhaust device arranged outside the housing.

5 Claims, 1 Drawing Sheet

BALL SCREW DEVICE WITH INTERNAL MOTORS

BACKGROUND OF THE INVENTION

1) Field of the Invention

This invention relates to a ball screw device with internal motors, which is suitable for use as actuators in machine tools, scalar robots or other industrial equipment.

2) Description of the Related Art

Conventional ball screw devices equipped with both a ball screw nut and a ball spline nut on a single common shaft are disclosed, for example, in U.S. Pat. No. 4,939,946 issued on Jul. 10, 1990. In this conventional ball screw device, a helical ball screw groove and linear, axial ball spline grooves are both formed on an outer circumference of a single shaft. A ball screw nut is fitted on the shaft via a number of balls received in the ball screw groove, while a ball spline nut is similarly fitted on the shaft via a number of balls received in the ball spline grooves. Both the nuts are rotatably assembled on a common housing, each by means of a combination of support bearings, whereby a ball screw unit is constructed. Both the nuts are connected to external drive motors by way of timing belts, respectively. The individual nuts are independently rotated or driven by the corresponding external drive motors, whereby the shaft is caused to undergo a reciprocating or rotating motion or a combined reciprocating and rotating motion.

The above-described conventional ball screw is of the construction that the ball screw unit and its drive units are discrete and are connected by the belts as power transmitting means. It is, therefore, accompanied by the problems that a limitation is imposed on its size reduction and further limitations are imposed on its application purpose and range in view of its installation space and position, its combination with an associated machine, or the like. Further, its power transmitting elements involve a play such as slipping of the belts, leading to the problem that the positioning accuracy is limited. In the case of a clean room specification, it is necessary to hermetically seal not only the ball screw nut and ball spline nut but also the power transmitting means and even the drive motors within a dustproof casing so that dust can be prevented from spreading into the clean room. This has resulted in the problem that the overall size of the device naturally becomes greater.

SUMMARY OF THE INVENTION

With the foregoing problems in view, the present invention has as a principle object the provision of a ball screw device with internal motors in which a ball screw unit and a drive unit are integrated and drive is feedback controlled by detecting it with sensors, whereby a reduction in size and an improvement in accuracy can be both achieved to overcome the above-described conventional problems.

In one aspect of the present invention, there is thus provided a ball screw device with internal motors, comprising:

a shaft provided with a ball screw groove and a ball spline groove;

a ball screw nut threaded on the shaft with balls interposed therebetween;

a ball spline nut threaded on the shaft with balls interposed therebetween;

direct drive motors having rotors and stators, respectively, said rotors provided on outer circumferences of the ball screw nut and ball spline nut, respectively, so that said rotors can rotate integrally with the corresponding nuts, and said stators arranged in an opposing circumference-to-circumference relationship with outer circumferences of the rotors and secured on an inner wall of a housing; and rotational position sensors for the detection of rotation angles of the respective nuts, said sensors being arranged close to each other between the nuts.

In another aspect of the present invention, there is also provided a ball screw device with internal motors, comprising:

a shaft provided with a ball screw groove and a ball spline groove;

a ball screw nut threaded on the shaft with balls interposed therebetween;

a ball spline nut threaded on the shaft with balls interposed therebetween;

direct drive motors having rotors and stators, respectively, said rotors provided on outer circumferences of the ball screw nut and ball spline nut, respectively, so that said rotors can rotate integrally with the corresponding nuts, and said stators arranged in an opposing circumference-to-circumference relationship with outer circumferences of the rotors and secured on an inner wall of a housing; and an air suction path provided in the housing to communicate gaps between the nuts and the shaft and gaps between the nuts and the corresponding drive motors to an exhaust means arranged outside the housing.

Owing to the assembly of the direct drive motors, which drive the ball screw nut and ball spline nut, respectively, inside the housing of the ball screw device, neither a separate nut-driving actuator not power transmitting parts therefor are required, thereby making it possible to construct the ball screw device compact. At the same time, it is possible to obviate any error which would otherwise be caused by a slip or the like of a belt, thereby making it possible to improve the positioning accuracy. By detecting the relative positions of both the nuts with the rotational position sensors and feedback controlling them, it is possible to secure the repetitious positioning accuracy of rotation of both the nuts and, hence, of rotating and/or reciprocal motion of the shaft. Further, the rotational position sensors are arranged close to each other between the nuts. This makes it possible to minimize the influence of positional non-uniformity in the temperature distribution, said non-uniformity being caused as a result of a localized temperature increase due to non-concurrent drive of the individual direct drive motors. This also contributes to an improvement in the positioning accuracy.

Further, the exhaust means is arranged outside the housing and, through the air suction path connected to the exhaust means, dust produced as a result of scattering or the like of grease in the bearings and nuts within the housing can be evacuated to the outside of the system. The space to be evacuated can be reduced so that the overall dimensions can be reduced even if the ball screw device is of a clean room specification. Further, the motors are effectively air-cooled by the suction of air s that heating of the motors is suppressed. It is hence possible to minimize the deleterious effects of heated motors on the positioning accuracy.

BRIEF DESCRIPTION OF THE DRAWING

The above and other objects, features and advantages of the present invention will become apparent from the following description and the appended claims, taken in conjunction with the accompanying sole drawing, in which:

DETAILED DESCRIPTION OF THE INVENTION AND PREFERRED EMBODIMENT

Figure 1:
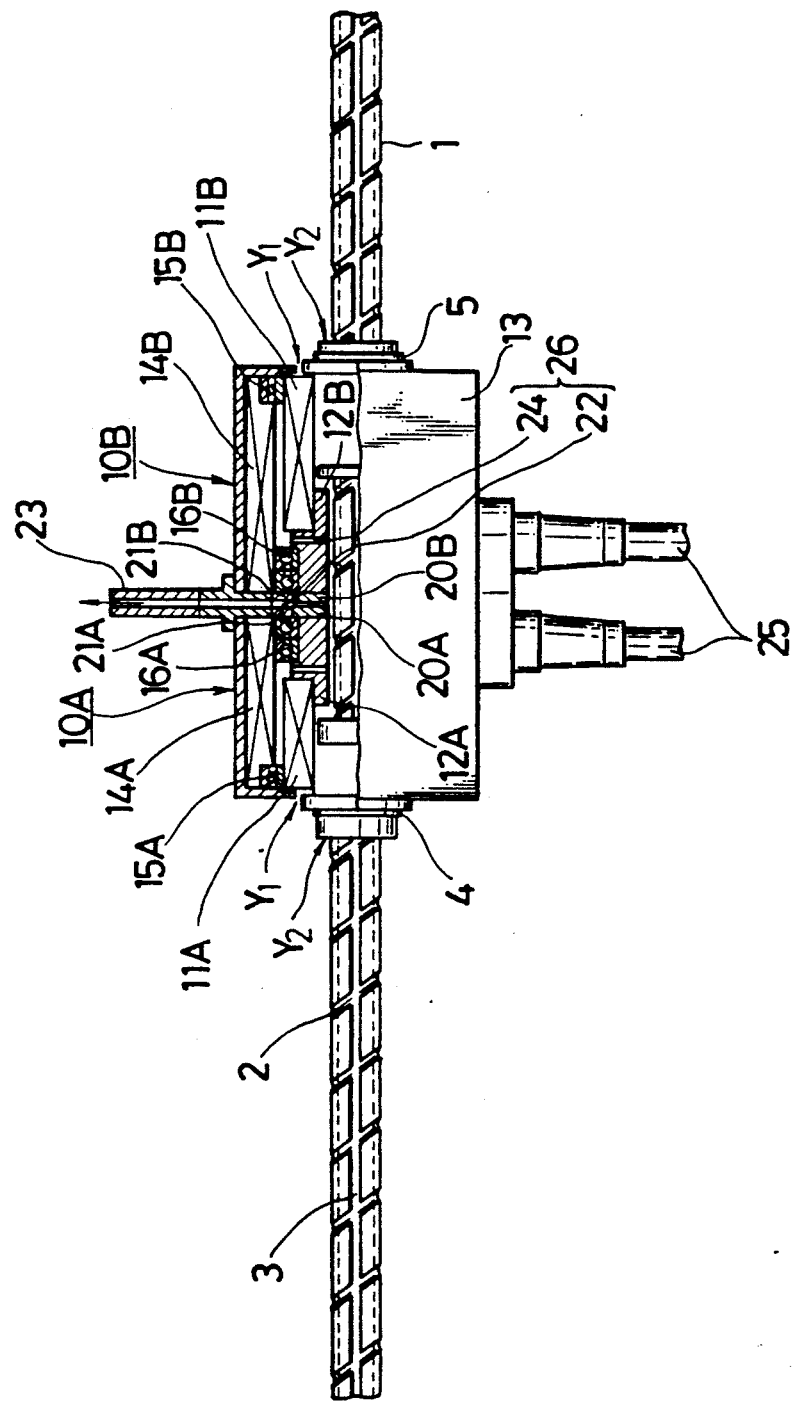
FIG. 1 is a half-sectional side view of a ball screw device according to one embodiment of the present invention.

One embodiment of the present invention will hereinafter be described based on the accompanying sole drawing. In the drawing, numeral 1 indicates a ball screw shaft. A helical ball screw groove 2 and axial linear ball spline grooves 4, each in the form of a Gothic arch groove, are formed on the ball screw shaft 1. A ball screw nut 4 and a ball spline nut 5 are both mounted on the ball screw shaft 1.

The ball screw nut 4 is provided with an unillustrated ball screw groove formed in an inner circumference thereof. The unillustrated ball screw groove has a Gothic arch configuration corresponding to the ball screw groove 2 of the ball screw shaft 1. Between the unillustrated ball screw groove of the nut 4 and the ball screw groove 2 of the ball screw shaft 1, a number of balls (not shown) are interposed for rotation. The ball screw nut 4 is also provided with a recirculation path for recirculating these balls in an endless fashion although it is not illustrated. As the ball screw shaft 1 and the ball screw nut 4 rotate relative to each other, the balls move helically while rolling in the screw grooves and, after turning one and a half times or three and a half times through the groove, return to the original position through a ball recirculation tube as a return path in the nut 4. The balls repeat this recirculation. In this respect, the ball screw device has a conventional structure.

On the other hand, the ball spline nut 5 is provided with a plurality of unillustrated ball spline grooves formed in an inner circumference thereof. These unillustrated ball spline grooves correspond to the ball spline grooves 3 which extend linearly along the ball screw shaft 1. Between the ball spline grooves of the nut 5 and the corresponding ball spline grooves 3 on the ball screw shaft 1, a number of unillustrated balls are interposed for rotation. The ball spline nut 5 is also provided with recirculation paths for the endless recirculation of these balls although they are not shown. As the ball screw shaft 1 and the ball spline nut 5 linearly move relative to each other, the balls linearly move while rolling in the ball spline grooves and, after reaching an axial end of the nut 5, enter return paths formed inside the nut 5, take a U-turn while being guided by their corresponding curved paths formed inside the nut 5, move back to an opposite end of the nut 5 through return channels provided in parallel with the ball screw shaft 1, take a reverse U-turn along corresponding curved paths formed there, and return to the original positions. The balls repeat this recirculation. In this respect, the ball screw device has a conventional structure.

On a cylindrical outer circumference of the ball screw nut 4, a cylindrical rotor 11A of a direct drive motor 10A to be described subsequently is integrally fitted on a side of one end portion thereof. An opposite end portion of the rotor 11A is supported immovably in an axial direction on an annular rotor support member 12A loose fitted on the ball screw shaft 1. Further, a cylindrical rotor 11B of a direct drive motor 10B is integrally fitted on a side of one end portion thereof on a cylindrical outer circumference of the ball spline nut 5. An opposite end portion of the rotor 11B is supported immovably in the axial direction on an annular rotor support member 12B loose fitted on the ball screw shaft 1.

The ball screw nut 4 and ball spline nut 5, both threaded on the ball screw shaft 1, the direct drive motors 10A,10B, the rotor support members 12A,12B, etc. are commonly enclosed in a cylindrical housing 13. On an inner circumference of the housing 13, a stator 14A is fixed in an opposing circumference-to-circumference relationship with the rotor 11A on the side of the ball screw nut 4 with a small gap left between the stator 14A and the rotor 11A. On the inner circumference of the housing 13, a stator 14B is similarly fixed in an opposing circumference-to-circumference relationship with the rotor 11B on the side of the ball spline nut 5 with a small gap left between the stator 14B and the rotor 11B. Between the circumferences of the stators 14A,14B and the opposing circumferences of the rotors 11A,11B, double-sealed single-row deep-groove ball bearings 15A,15B are interposed as support bearings, respectively. Interposed between the circumferences of the stators 14A,14B and the opposing circumferences of the rotor support members 12A,12B are back-to-back duplex angular ball bearings 16A,16B having high resistance to moment loads.

The direct drive motors 10A,10B in this embodiment are, for example, DC servomotors (alternatively, AC servomotors). In the individual motors 10A,10B, the rotor support members 12A,12B supporting thereon the corresponding rotors 11A,11B are provided on proximal, opposing end faces thereof with optical rotary encoders as rotational position sensors 20A,20B, respectively. Each of these rotational position sensors 20A,20B has a light emitting and receiving semiconductor element. The optical rotary encoders may be magnetic rotary encoders each of which has a semiconductor magnetic element. The principal object of these rotational position sensors 20A,20B is to measure their respective rotational positions and, from the results of the measurement, to determine the mutual positional relationship between the rotors 11A and 11B of the direct drive motors 10A and 10B arranged in combination and, hence, between the ball screw nut 4 and the ball spline nut 6 and then to control the drive of the motors by using an output signal, so that the repetitious accuracy of motion of the ball screw shaft 1 can be ensured. It is designed to perform a so-called semiclosed loop control, that is, the rotation angle of each rotor support member 12A(12B) is detected by the rotational position sensor 20A(20B), a signal indicating the detection is fed back as a rotational position signal to an unillustrated positioning control circuit, any difference from a position value commanded by an unillustrated controller is corrected, and the drive of the motor 10A(10B) is then controlled via an unillustrated drive circuit. Although not illustrated in the drawing, a limit switch for detecting the end position of retreat of the ball screw shaft 1 as an origin for setting an absolute position is also arranged on an end face of the housing 13.

The reason for the arrangement of the rotational position sensors 20A,20B at a small distance therebetween at the central location is to equalize the influence of a temperature increase, which takes place when the direct drive motors 10A,10B are energized, to the semiconductor sensors provided in combination and hence to minimize the influence as much as possible.

The duplex angular ball bearings 16A,16B interposed between the rotor support members 12A,12B and the stators 14A,14B, respectively, are not provided with any grease seal, but bearing openings in their mutually-opposing end portions are hermetically closed by seal members 21A,21B, respectively. A space defined between the rotor support members 12A,12B, said space being shielded from the bearings 16A,16B owing to the provision of the seal members 21A,21B, is communicated to a dust suction pipe 23 via a suction adapter 22 attached on an outer circumference of the housing 13. In addition, a radial suction hole 24 is formed through the cylindrical wall of each rotor support member 12A(12B), whereby a spacing between each rotor 11A(11B) and its corresponding stator 14A(14B) and a spacing between its corresponding rotor support member 12A(12B) and the ball screw shaft 1 are communicated to each other. An air suction path 26 is formed by the suction adapter 22 and the suction holes 24,24.

Designated at numeral 25 is electrical wiring for the stator coils of the direct drive motors 10A,10B and the rotational position sensors 20A,20B.

A description will next be made of the operation of the ball screw device with the internal motors.

The ball screw device with the internal motors can be used as an actuator, for example, by fixedly securing the housing 13 on a mount of an unillustrated machine tool, robot or the like. The ball screw shaft 1 can be moved back and forth and rotate in normal or reverse direction by rotating the ball spline nut 5 and the ball screw 4.

When the direct drive motor 10A alone is energized to rotate only the rotor 11A and, hence, the ball screw nut 4 in a normal (reverse) direction, the ball screw shaft 1 axially advances (or retreat). The distance of the advance (or the retreat) can be determined in advance as a normal (or reverse) rotation angle of the rotor 11A and can be inputted in an unillustrated controller. When the stator coil of the direct drive motor 10B is energized to rotate only the rotor 11B and, hence, the ball spline nut 5, the ball screw shaft 1 moves in the axial direction while being rotated. When the stator coils of the direct drive motors 10A,10B are simultaneously energized to rotate the ball screw nut 4 and the ball spline nut 5 at the same revolution speed in the same direction, the ball screw shaft 1 undergoes only rotation without axial movement. When the ball screw nut 4 and the ball spline nut 5 are driven at different revolution speeds, the ball screw shaft 1 undergoes combined motion of rotary motion and axial motion. When the directions of their rotations are reversed, the respective motions are also reversed in direction.

To cause the ball screw shaft 1 to undergo these motions over desired distances in a predetermined order and at prescribed timings, respectively, positioning commands such as moving distances and speeds are programmed beforehand in a program memory of the unillustrated controller, and output signals of the controller are fed to a drive circuit via a positioning control circuit to energize the direct drive motors 10A,10B, whereby the commands are executed. In the course of the execution of the commands, the relative positions of the rotor support members 12A,12B disposed in combination are constantly detected by means of the rotational position sensors 20A,20B, respectively, and are fed back to the positioning control circuit. Signals indicating any differences from the individual command signals are fed to the drive circuit so that the energization of the direct drive motors 10A,10B is controlled as programmed. The rotation of the ball screw nut 4 and the ball spline nut 5 is precisely controlled in this manner, whereby a high degree of repetitious accuracy ensured for the various motions of the ball screw shaft 1. When only one of the direct drive motors 10A,10B is continuously energized in the above operations, the temperature of the ball screw shaft 1 rises locally because of heating of the direct drive motor so energized. As a result, localized unevenness in temperature takes place. In the present embodiment, the rotational position sensors 20A,20B are arranged close to each other on the opposing end faces of the rotor support members 12A,12B, respectively, so that the rotational position sensors 20A,20B are located between the nuts 4 and 5. The rotational position sensors 20A,20B are therefore affected extremely little by such localized temperature unevenness. As a consequence, any influence of a temperature increase, which takes place as a result of drive of the ball screw device, to the semiconductor sensors arranged in combination can be equalized and minimized as much as possible. A further improvement can therefore be made in the positioning accuracy in this respect.

Owing to the incorporation of the direct drive motors 10A,10B within the housing 13 of the ball screw device, the ball screw device according to the present invention, unlike the prior art, no longer requires drive motors provided outside the housing and timing belts or the like for connecting the drive motors with the ball screw device. Further, the adoption of the semi-closed loop control has made it possible to stably control the ball screw device without being affected by backlash, elastic deformation and the like of the mechanical elements such as timing belts, pulleys and ball screws, leading the attainment of positional accuracy markedly improved over the prior art.

During the above operation, the interior of the housing 13 is sucked and evacuated via the air suction path 26 by an unillustrated exhaust means which is connected to the suction adapter 22 via the dust suction pipe 23. As a consequence, the external air continuously flows, as air streams $Y_1,Y_2$, into the housing 13. The air streams $Y_1$ flow through gaps between the ball screw nut 4 and ball spline nut 5 and the housing 13, pass by the rotors 11A,11B, enter motor gap spacings, pass through the suction holes 24,24 of the rotor support members 12A,12B, flow further through the gaps between the rotor support members 12A,12B and the ball screw shaft 1, and then reach the suction adapter 22. The air is eventually exhausted from the suction adapter 22. The air stream $Y_2$ enter through the gaps between the ball screw nut 4 and ball spline nut 5 and the ball screw shaft 1 and reach the suction adapter 22, where the air streams $Y_2$ are exhausted. The seal members 21A,21B which close up the bearing openings at the opposing end portions of the angular ball bearings 16A,16B serve to prevent the grease inside the bearings from being sucked out directly together with the air exhausted through the suction adapter 22. The air streams $Y_1,Y_2$ prevent dust from scattering out from the interior of the housing 13 to the exterior of the housing 13 and contaminating a dust-free room or the like. At the same time, the air streams $Y_1, Y_2$ also serve to cool the direct drive motors 10A, 10B and hence to reduce the temperature increase inside the housing. As a result, it is possible to reduce the reduction in the positioning accuracy, which would take place as a result of thermal expansion of the individual parts.

According to the construction described above, it is only necessary to evacuate only the extremely compact housing 13 which is different from a conventional large housing with pulleys and belts accommodated therein. The exhaust means for the housing 14 may therefore be of a small capacity. This has also contributed to the side reduction of the overall device. Needless to say, the integration of the direct drive motors as drive means inside the ball screw device has made it possible to use the ball screw device in various ways, thereby resulting in broadening of its application fields.

What is claimed is:

1. A ball screw device with internal motors, comprising:
    a shaft provided with a ball screw groove and a ball spline groove;
    a ball screw nut threaded on the shaft with balls interposed therebetween;
    a ball spline nut threaded on the shaft with balls interposed therebetween;
    direct drive motors having rotors and stators, respectively, said rotors provided on outer circumferences of the ball screw nut and ball spline nut, respectively, so that said rotors can rotate integrally with the corresponding nuts, and said stators arranged in an opposing circumference-to-circumference relationship with outer circumferences of the rotors and secured on an inner wall of a housing; and
    rotational position sensors for the detection of rotation angles of the respective nuts, said sensors being arranged close to each other between the nuts.

2. A ball screw device according to claim 1, further comprising a positioning control circuit connected to the rotational position sensors and a drive circuit for energizing the direct drive motors in accordance with signals from the positioning control circuit.

3. A ball screw device according to claim 1, wherein the rotational position sensors are optical rotary encoders.

4. A ball screw device according to claim 1 further comprising an air suction path provided in the housing to communicate gaps between the nuts and the shaft and gaps between the nuts and the corresponding drive motors to an exhaust means arranged outside the housing.

5. A ball screw device according to claim 4, wherein the air suction path is defined radially between the direct drive motors.

* * * * *